(12) United States Patent
Shabtay et al.

(10) Patent No.: US 12,299,965 B2
(45) Date of Patent: May 13, 2025

(54) MACHINE LEARNING TRAINING DATASET OPTIMIZATION

(71) Applicant: DATALOOP LTD., Herzliya (IL)

(72) Inventors: Or Shabtay, Tel-Aviv (IL); Eran Shlomo, Zichron Yaakov (IL)

(73) Assignee: DATALOOP LTD., Herzliya (IL)

( * ) Notice: Subject to any disclaimer, the term of this patent is extended or adjusted under 35 U.S.C. 154(b) by 0 days.

(21) Appl. No.: 18/754,511

(22) Filed: Jun. 26, 2024

(65) Prior Publication Data

US 2024/0346808 A1 Oct. 17, 2024

Related U.S. Application Data

(63) Continuation of application No. 17/306,006, filed on May 3, 2021, now Pat. No. 12,046,021.

(60) Provisional application No. 63/019,353, filed on May 3, 2020.

(51) Int. Cl.
*G06V 10/774* (2022.01)
*G06F 18/2115* (2023.01)
*G06F 18/214* (2023.01)
*G06N 20/00* (2019.01)

(52) U.S. Cl.
CPC ........ *G06V 10/774* (2022.01); *G06F 18/2115* (2023.01); *G06F 18/2148* (2023.01); *G06N 20/00* (2019.01)

(58) Field of Classification Search
CPC .............................. G06V 10/774; G06N 20/00
See application file for complete search history.

(56) References Cited

U.S. PATENT DOCUMENTS

| | | | |
|---|---|---|---|
| 11,893,772 B1 * | 2/2024 | Gokalp | G06V 10/758 |
| 2018/0060757 A1 * | 3/2018 | Li | G06N 20/00 |
| 2021/0142068 A1 * | 5/2021 | Aliamiri | G06V 20/47 |

* cited by examiner

*Primary Examiner* — Edward Park
(74) *Attorney, Agent, or Firm* — The Roy Gross Law Firm, LLC; Roy D. Gross

(57) ABSTRACT

A method comprising: receiving a dataset comprising a plurality of data instances; extracting a feature vector representation of each of the data instances in the dataset; choosing a first data instance for adding to a subset of the dataset, wherein the first data instance is removed from the dataset; performing an iterative process comprising: (i) identifying one of the data instances in the dataset which represents a maximal information addition to the subset, based, at least in part, on measuring an information difference parameter between the feature vector representation of the identified data instance and the feature vector representations of all of the data instances in the subset, and (ii) adding the identified data instance to the subset and removing the identified data instance from the dataset, until the information difference parameter is lower than a predetermined threshold; and outputting the subset as a representative subset of the dataset.

18 Claims, 9 Drawing Sheets

MACHINE LEARNING TRAINING DATASET OPTIMIZATION

CROSS-REFERENCE TO RELATED APPLICATIONS

This Application is a Continuation of U.S. patent application Ser. No. 17/306,006, filed May 3, 2021, entitled "MACHINE LEARNING TRAINING DATASET OPTIMIZATION," which claims priority to U.S. Provisional Patent Application No. 63/019,353, filed May 3, 2020, entitled "MACHINE LEARNING TRAINING DATASET OPTIMIZATION." the contents of which are all incorporated herein by reference in their entirety.

BACKGROUND

The invention relates to the field of machine learning.

To create accurate machine learning models, large quantities of properly-annotated training data are required. For example, object recognition models require training sets of annotated images to enable the model to learn robust classification.

However, creating large sets of labeled images involves a costly and labor-intensive process, which is typically performed manually by annotation specialists. Moreover, the labeling resources and budgets are not always allocated in an optimal way, because it is not always known at the training stage which raw data samples are potentially the most useful for training the model.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive, as input, a dataset comprising a plurality of data instances, extract a feature vector representation of each of the data instances in the dataset, choose, from the dataset, a first data instance for adding to a subset of the dataset, wherein the first data instance is removed from the dataset, perform an iterative process comprising: (i) identifying one of the data instances in the dataset which represents a maximal information addition to the subset, based, at least in part, on measuring an information difference parameter between the feature vector representation of the identified data instance and the feature vector representations of all of the data instances in the subset, and (ii) adding the identified data instance to the subset and removing the identified data instance from the dataset, until the information difference parameter is lower than a predetermined threshold, and output the subset as a representative subset of the dataset.

There is also provided, in an embodiment, a computer-implemented method comprising: receiving, as input, a dataset comprising a plurality of data instances; extracting a feature vector representation of each of the data instances in the dataset; choosing, from the dataset, a first data instance for adding to a subset of the dataset, wherein the first data instance is removed from the dataset; performing an iterative process comprising: (i) identifying one of the data instances in the dataset which represents a maximal information addition to the subset, based, at least in part, on measuring an information difference parameter between the feature vector representation of the identified data instance and the feature vector representations of all of the data instances in the subset, and (ii) adding the identified data instance to the subset and removing the identified data instance from the dataset, until the information difference parameter is lower than a predetermined threshold; and outputting the subset as a representative subset of the dataset.

There is further provided, in an embodiment, a computer program product comprising a non-transitory computer-readable storage medium having program instructions embodied therewith, the program instructions executable by at least one hardware processor to: receive, as input, a dataset comprising a plurality of data instances; extract a feature vector representation of each of the data instances in the dataset; choose, from the dataset, a first data instance for adding to a subset of the dataset, wherein the first data instance is removed from the dataset; perform an iterative process comprising: (i) identifying one of the data instances in the dataset which represents a maximal information addition to the subset, based, at least in part, on measuring an information difference parameter between the feature vector representation of the identified data instance and the feature vector representations of all of the data instances in the subset, and (ii) adding the identified data instance to the subset and removing the identified data instance from the dataset, until the information difference parameter is lower than a predetermined threshold; and output the subset as a representative subset of the dataset.

In some embodiments, the program instructions are further executable to receive, and the method further comprises receiving, a budgetary constraint, wherein the budgetary constraint causes the iterative process to stop before the information difference parameter is lower than the predetermined threshold.

In some embodiments, the budgetary constraint is expressed as at least one of: a maximal number of data instances in the subset, and a maximal computational time limit applicable to the performance of the repeating.

In some embodiments, the program instructions are further executable to, and the method further comprises: assigning a label to each of the data instances in the outputted subset; training a machine learning model on a training set comprising (a) the data instances in the subset, and (b) the assigned labels; performing the iterative process with respect to all remaining data instances in the dataset, wherein the iterative process results in a second subset of the dataset; and applying the trained machine learning model to at least some of the data instances in the second subset, to assign each of the data instances to one of a set of classes.

In some embodiments, the program instructions are further executable to associate, and the method further comprises associating, a label with each of the data instances, and wherein the label is determined based, at least in part, on the assigned class.

In some embodiments, the feature vector representation is obtained using at least one of: supervised or unsupervised dictionary learning, autoencoding, k-means clustering, principal component analysis, independent component analysis, linear embedding, neural network model features, frequency space mapping, image histogram, and scale-invariant feature transform (SIFT) feature detection algorithm.

In some embodiments, the measuring of the information difference is based, at least in part, on one of: a Euclidean distance calculation, an information entropy calculation, and a feature probability distribution calculation.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
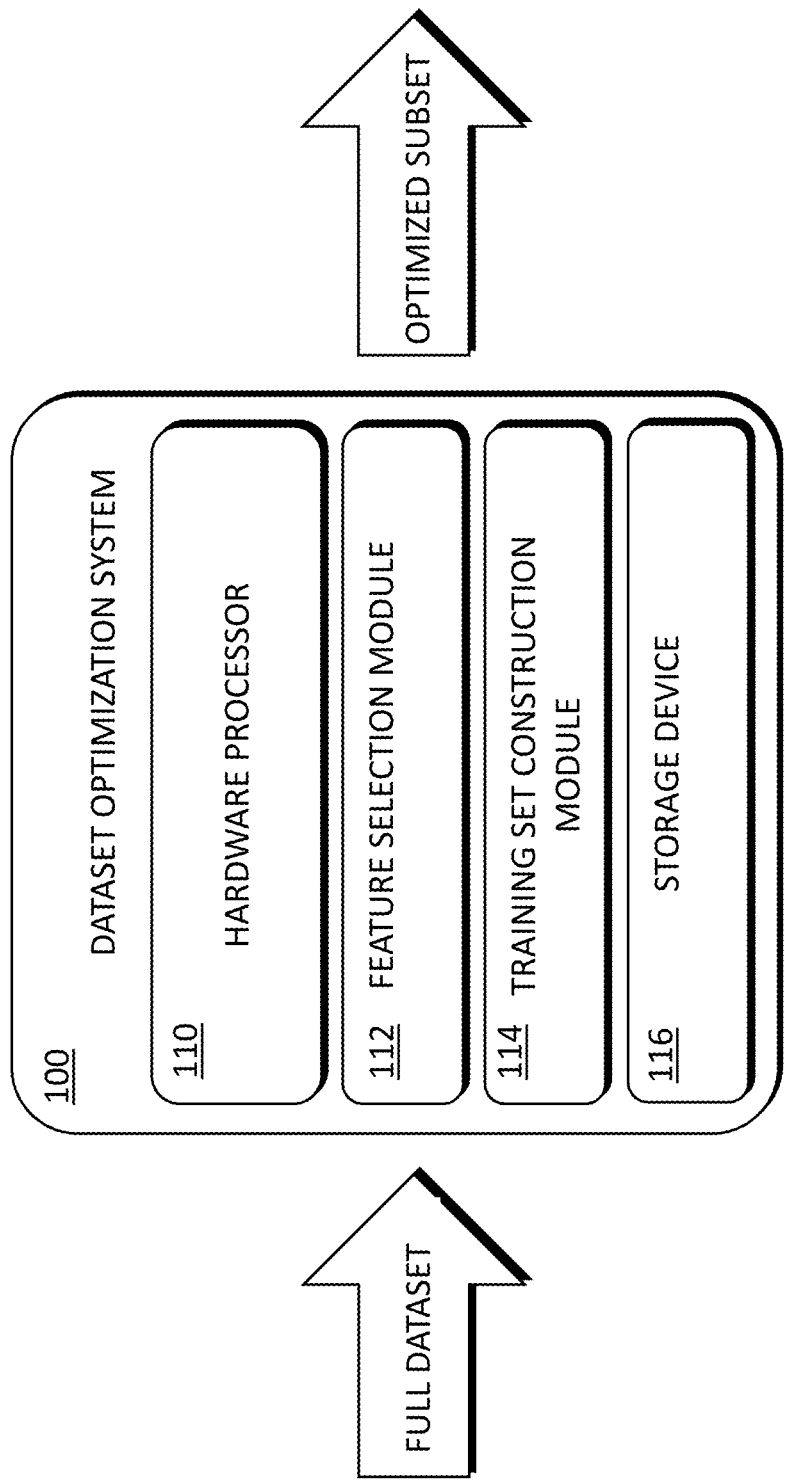
FIG. 1 illustrates an exemplary system for automated real-time confidence score validation, in accordance with some embodiments of the present invention.

Disclosed herein is a technique, embodied in a system, method, and computer program product, for automated selection of an optimal representative subset of data instances or samples from a provided set, wherein the selected subset is intended for training a machine learning model.

In some embodiments, the present disclosure provides for selecting a subset from a provided set of data samples, wherein the selected subset provides the same or a closely similar data representation, diversity, and coverage as the full provided set. Accordingly, in some embodiments, a selected subset has sufficient number of entries to represent the diversity of data in the full data set.

In some embodiments, the selected subset may be used for training a machine learning model. Accordingly, a machine learning model trained on the selected subset may exhibit performance metrics (e.g., discriminative, classification, prediction, and/or generative performance) that are substantially similar to those which may be obtained with a model trained on the full dataset. In some embodiments, training a machine learning model on the selected subset may result in significantly reduced annotation costs and/or computational resource usage, without negatively affecting performance results.

In some embodiments, the present disclosure provides for an iterative process for selecting an optimal representative subset of data samples or instances from a provided dataset. In some embodiments, the selected subset is smaller in size compared to the original dataset, captures the most information from the original dataset compared to any other subset of the same size, and/or has low redundancy among the data instances included therein.

By way of background, during a learning process, most learning algorithms use all instances from the given training dataset to estimate parameters of a machine learning model. However, commonly, many instances in the training set are information-poor and do not improve the performance of the model, and sometimes may even degrade it. For example, training sets may include redundant information, e.g., two or more copies of the same or significantly similar data instances.

Using identical or very similar data instances for training purposes may results in a large number of redundant computations, and an unnecessary increase in graphical processing unit (GPU) computations times. In addition, preparing data instances for use a training samples may require manual annotation or labeling of the samples, which is a labor-intensive and costly process. Duplicate data instances may therefore significantly increase the annotation costs associated with creating a training set.

Accordingly, there may be several motivations to eliminating low-value instances from datasets, including training set size reduction, noise reduction, and reduction in computational costs in instance-based learners. Eliminating information-poor instances allows for reduction is time and costs, and for more optimally allocating labeling budgets to provide for better-trained models while investing fewer resources.

For example, some data acquisition processes may result in millions of images, many of which may be closely related and do not add significant information over the set, which makes them redundant or even detrimental to the training process. Accordingly, selecting the most informative and/or representative frames from massive sets of acquired images may reduce annotation costs and/or computational resource usage significantly, without negatively affecting training results. This selection process also, by definition, eliminates degraded, blurry, and/or noisy data samples, which also helps to promote better training results. In another example, video acquisition modalities may result in 25-50 frames acquired per second of video, wherein frame-to-frame information differentials may be low or even nonexistent. In addition, some frames may present blurry or noisy images which may not contribute to, or even degrade, the training process. Thus, in the case of video data samples, there are advantages to selecting those frames which may represent valuable training data samples, and discard those frames that are data poor or redundant.

FIG. 1 illustrates an exemplary system 100 for automated selecting of an optimal representative subset of data instances or samples from a provided dataset, in accordance with some embodiments of the present invention. System 100 as described herein is only an exemplary embodiment of the present invention, and in practice may have more or fewer components than shown, may combine two or more of the components, or a may have a different configuration or arrangement of the components. The various components of system 100 may be implemented in hardware, software, or a combination of both hardware and software. In various embodiments, system 100 may comprise a dedicated hardware device, or may form an addition to or extension of an existing device.

In some embodiments, system 100 may comprise a hardware processor 110 and memory storage device 116, comprising a random-access memory (RAM) and one or more non-transitory computer-readable storage device(s). In some embodiments, system 100 may store in a non-volatile memory thereof, such as storage device 116, software instructions or components configured to operate a processing unit (also 'hardware processor,' 'CPU,' or simply 'processor'), such as hardware processor 110. In some embodiments, the software components may include an operating system, including various software components and/or drivers for controlling and managing general system tasks (e.g., memory management, storage device control, power management, etc.) and facilitating communication between various hardware and software components.

The software instructions and/or components operating hardware processor 110 may include instructions for receiving and analyzing multiple frames captured by a suitable imaging device. for example, hardware processor 110 may comprise a feature extraction module 112; and a training set construction module 114.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing 'instances,' 'containers,' 'virtual machines,' or other types of encapsulated software applications, as known in the art. As one example, system 100 may in fact be realized by two or more separate but similar systems. These two or more systems may cooperate, such as by transmitting data from one system to the other (over a local area network, a wide area network, etc.), so as to use the output of one module as input to the other module.

The instructions of feature extraction module 112 and/or training set construction module 114 are now discussed with reference to the flowchart of FIGS. 2A-2C, which illustrates the functional steps in a method for automated real-time confidence score validation, in accordance with some embodiments of the present invention.

Figure 2A:
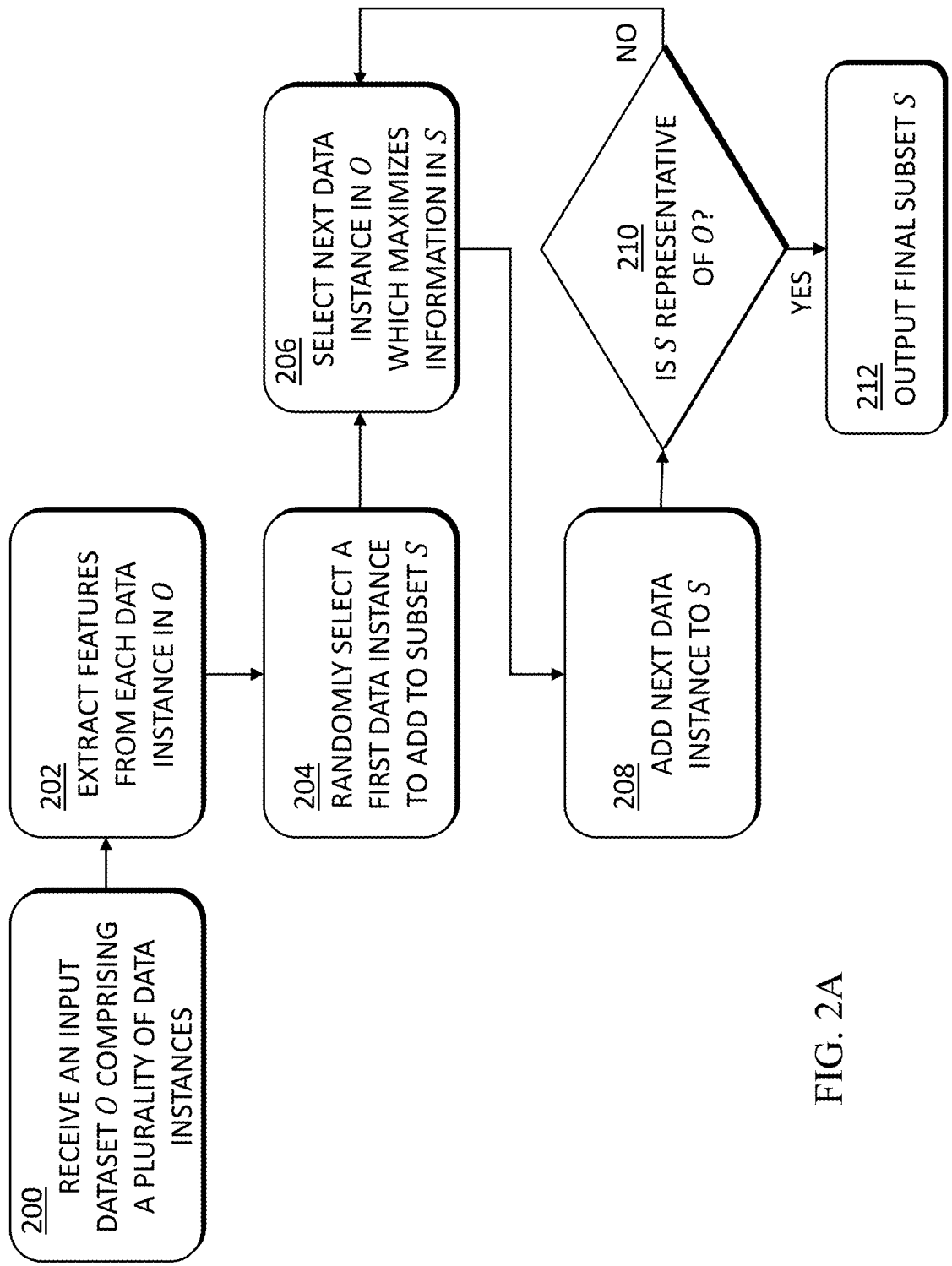
FIGS. 2A-2C are flowchart detailing the functional steps in a process for automated real-time confidence score validation, in accordance with some embodiments of the present invention.

FIG. 2A is a flowchart detailing the functional steps in an exemplary process for automated selecting of an optimal representative subset of data instances or samples from a provided dataset, in accordance with some embodiments of the present invention.

In some embodiments, the selected subset may be used to train a machine learning model to learn a machine learning task, e.g., a discriminative task, a classification task, a prediction task, and/or a generative task, wherein a machine learning model trained on the selected subset may have performance metrics that are substantially similar or equal to those to those which may be obtained with a model trained on the full dataset.

As used herein, the term 'techniques' may refer to any systems, methods, computer-readable instructions, modules, algorithms, hardware logic and/or operations as permitted by the context described throughout this document.

The term 'machine learning model' or simply 'model' is intended to refer to any type of machine learning model which is capable of producing an output, be it a classification, a prediction, or generation of new data, based on input. A machine learning model is any of several methods and/or algorithms which are configured to perform a specific informational task (such as classification) using a limited number of examples of data of a given form, and are then capable of exercising this same task on unknown data of the same type and form. A machine learning model may be implemented using various model architectures and training algorithms, e.g., deep convolutional neural networks (CNNs), fully convolutional neural networks (FCNs), or recurrent neural networks (RNNs).

In addition, the terms 'detection,' 'classification' and 'prediction' are used interchangeably for reasons of simplicity, and are intended to refer to any type of output of a machine learning model. This output may be in the form of a class and a score which indicates the certainty that the input belongs to that class. Various types of machine learning models may be configured to handle different types of input and produce respective types of output; all such types are intended to be covered by present embodiments.

With reference back to FIG. 2A, in some embodiments, is step 200, an input dataset O comprising a plurality of data samples or instances may be received.

In some embodiments, O denotes an original population, and S denotes a sample set defined as a subset of O, which is collected via a specified process in order to obtain instances that can represent original population O. In some embodiments, a representative subset S is a special subset of original dataset O, which satisfies at least three main characteristics:

S is smaller in size compared to O;
S captures the most information from O compared to any other subset of the same size; and
S has none or a very low redundancy among the data instances included therein.

In some embodiments, is step 202, the instructions of feature extraction module 112 may cause it to perform feature extraction or representation-learning with respect to each data instance in set O, to obtain a feature vector representation of each data instance in O.

As used herein, a 'feature' is any individual measurable property or characteristic of a data instance which may be observed. A feature may hold informative, explanatory, and/or discriminating power with respect to a data instance from which hit is extracted. Features may be numeric or structural (e.g., strings and graphs are used in syntactic pattern recognition. As used herein, the term 'feature vector' generally refers to a vector of length one or greater, where the value at one or more units of the vector describes an attribute or feature of a corresponding data instance.

Accordingly, in some embodiments, in step 202, feature extraction module 112 may be configured to calculate and/or extract and/or learn a feature vector with respect to each data instance in O. In some embodiments, this step is employed to automatically discover a data representation of each data instance that is computationally convenient for processing. In some embodiments, feature extraction or learning techniques may include any suitable feature extraction and/or dimensionality reduction method. In some embodiments, suitable feature learning methods may be selected based, e.g., on the type of data instance in set O (e.g., images, video data, textual data, voice data, biological data, etc.). In some embodiments, such methods include, but are not limited to, supervised or unsupervised dictionary learning, autoencoding, k-means clustering, principal component analysis, independent component analysis, linear embedding, neural network model features, frequency space mapping, image histogram, and/or SIFT features.

Figure 3A:
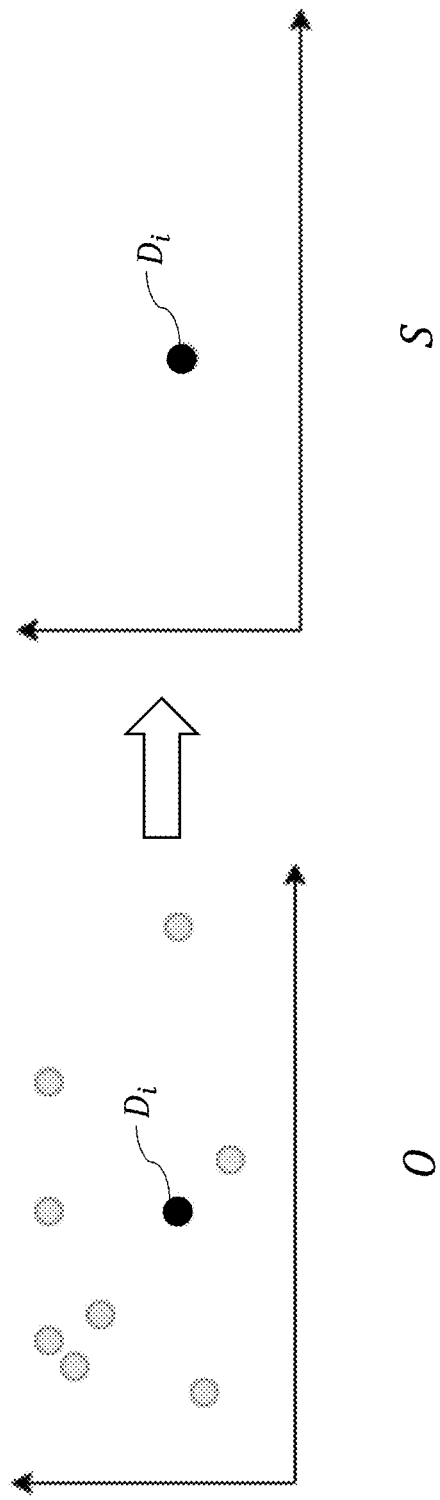
FIGS. 3A-3E schematically illustrate a process for automated real-time confidence score validation, in accordance with some embodiments of the present invention.

In some embodiments, in step 204, and as can be seen in FIG. 3A, the instructions of training set construction module 114 may cause it to select a first data instance $D_i$, e.g., at random, from O, and move it to S, to initialize the selection process of subset S.

In some embodiments, in steps 206-210, the instructions of training set construction module 114 may cause it to perform an iterative process for selecting an optimal representative subset S of data instances from the received dataset. FIGS. 3A-3E schematically illustrate a process implemented in steps 206-210.

Figure 3B:
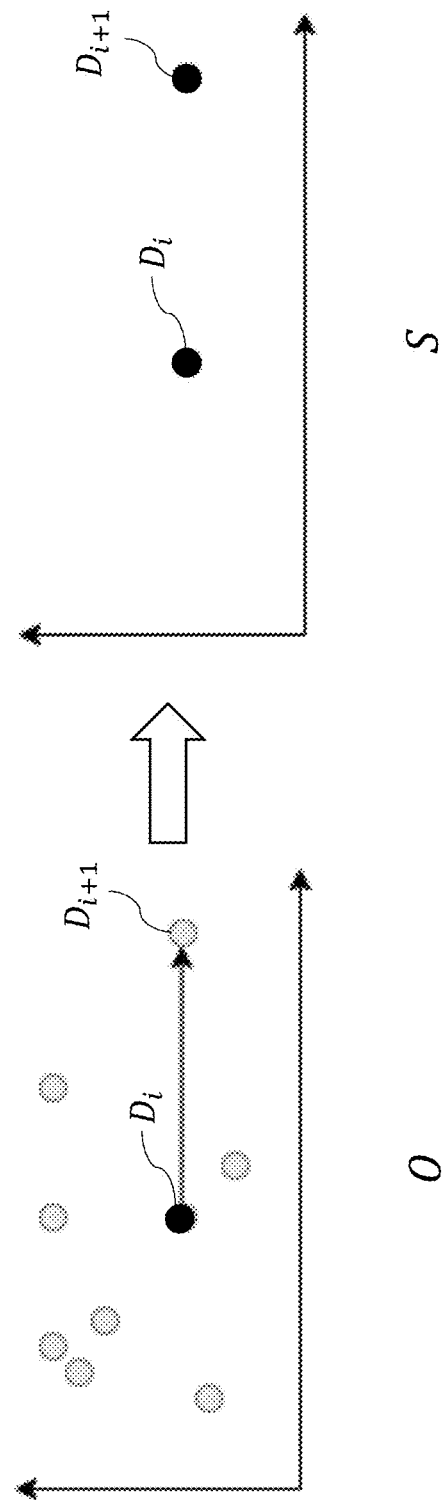

Then, in step 204, and as can be seen in FIG. 3B, a next data instance $D_{i+1}$ may be selected from O for moving to subset S, wherein $D_{i+1}$ is selected to maximize an information quantity in S, as follows:

$$O:k=\max(\text{information}(s))$$

Accordingly, a selection process of $D_{i+1}$ may be based, at least in part, on calculating an information quantity in each data instance remaining in O, to select an instance $D_{i+1}$ which, if moved to S, maximizes an information addition to S. In some embodiments, information maximization may be based on any suitable information quantification methodology which compares the feature vectors associated with next data instance $D_{i+1}$ with the feature vectors of each of the data instances already in S. In some embodiments, such methodology may be based on, e.g., feature Euclidean distance calculation, an information entropy calculation between $D_{i+1}$ and S, a feature probability distribution, and/or any other methodology.

Figure 3C:
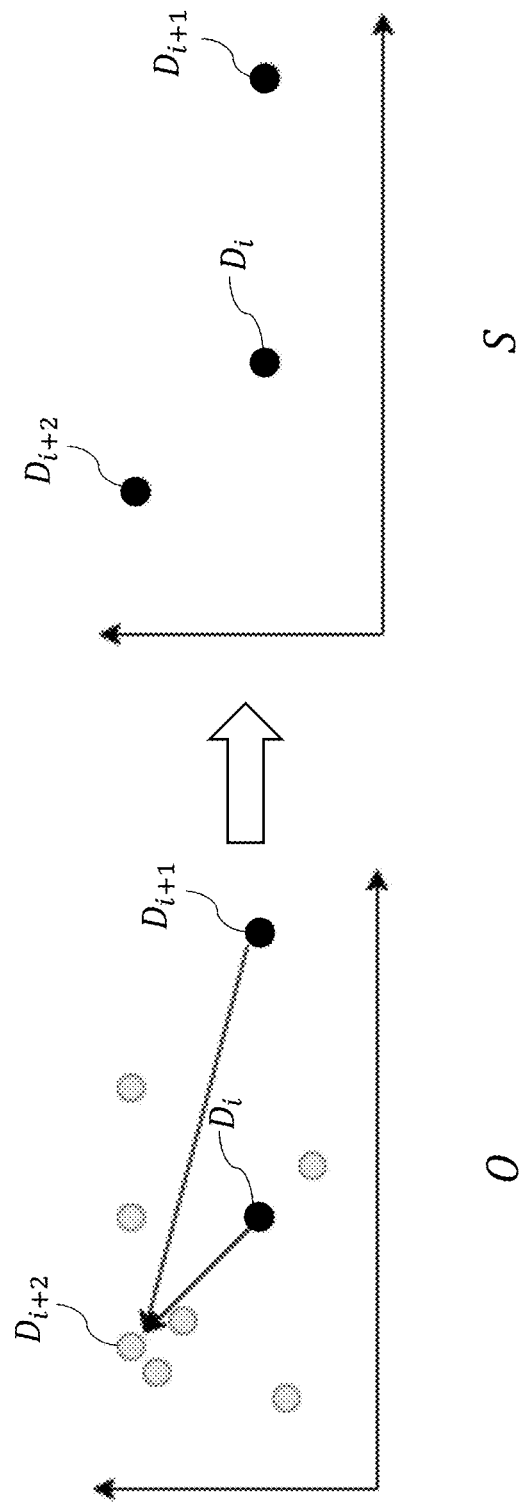
Figure 3D:
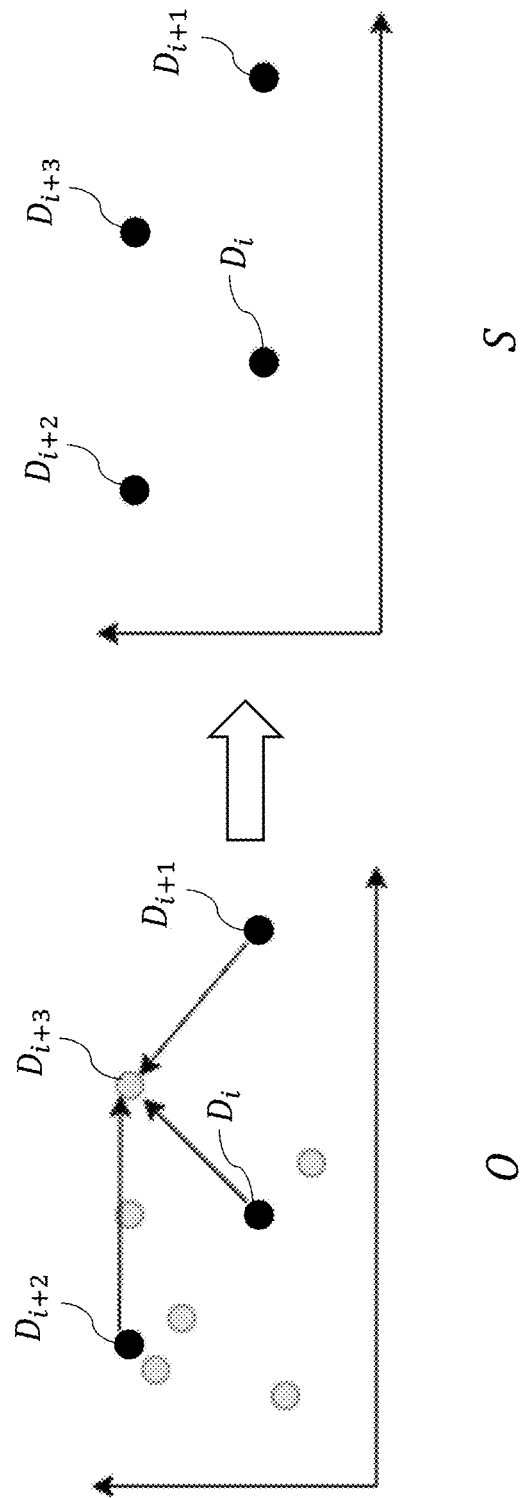
Figure 3E:
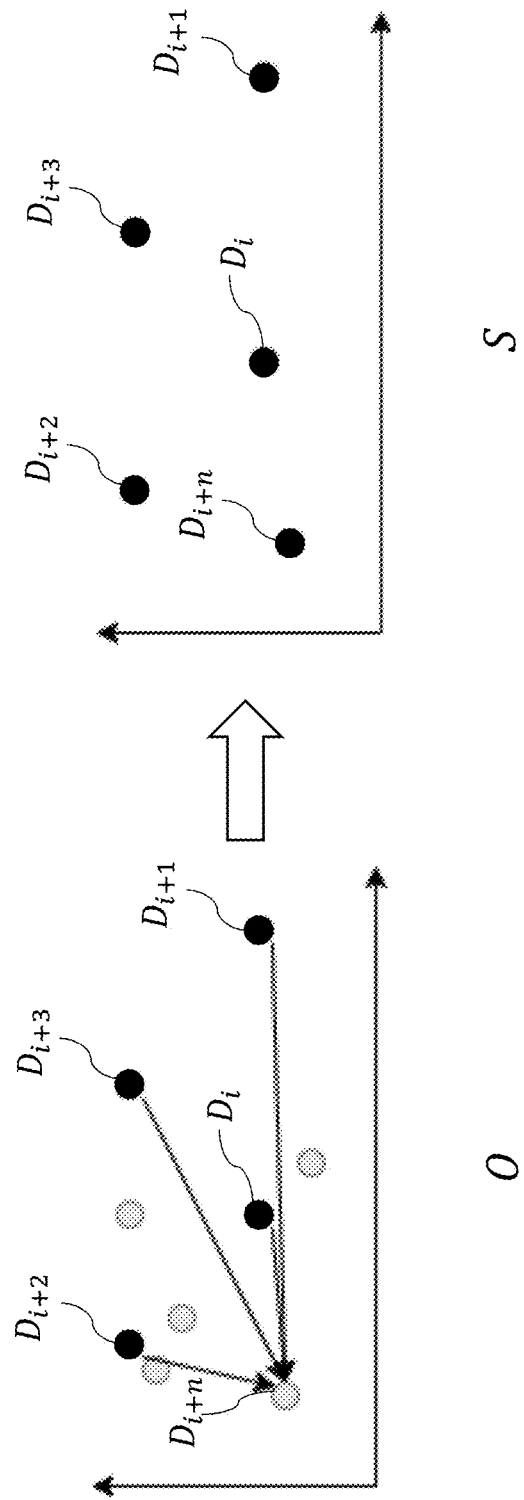

Accordingly, in step 206, if it is determined that next data instance $D_{i+1}$ represents a maximal information addition from O to S, the next data instance is added to S in step 208 and removed from O. Steps 206-210 are then repeated for selecting next data instances $D_{i+2}, D_{i+3} \ldots D_{i+n}$, as can be seen in FIGS. 3C-3E. Thus, for example, in FIG. 3A, data instance $D_i$ is randomly selected for adding to S. In FIG. 3B, next data instance $D_{i+1}$, representing the greatest information quantity over $D_i$ among all remaining data instance in O, is selected for adding to S. Then, in FIG. 3C, next data instance $D_{i+2}$, representing the greatest information quantity over $D_i$ and $D_{i+1}$ among all remaining data instance in O, is selected for adding to S. Similarly, in FIG. 3D, next data instance $D_{i+3}$, representing the greatest information quantity over $D_i$, $D_{i+1}$, and $D_{i+2}$ among all remaining data instance in O, is selected for adding to S. And so on, until $D_{i+n}$ is added to S.

In some embodiments, in step 210, during each iteration, the iterative process of steps 206-210, is checked to determine a level of representation of S with respect to O. For example, after each addition of a data instance $\{D_i, \ldots, D_{i+n}\}$ to S, the added data instance is checked to determine whether an information quantity represented by the data instance exceeds a predetermined threshold. Once it is determined that next data instance $D_{i+n}$ adds an information quantity to S which is below the predetermined threshold, the iterative process of steps 206-210 ceases.

In some embodiments, in step 212, all data instances which were added to S in steps 206-210 are set as final subset S.

Figure 2B:
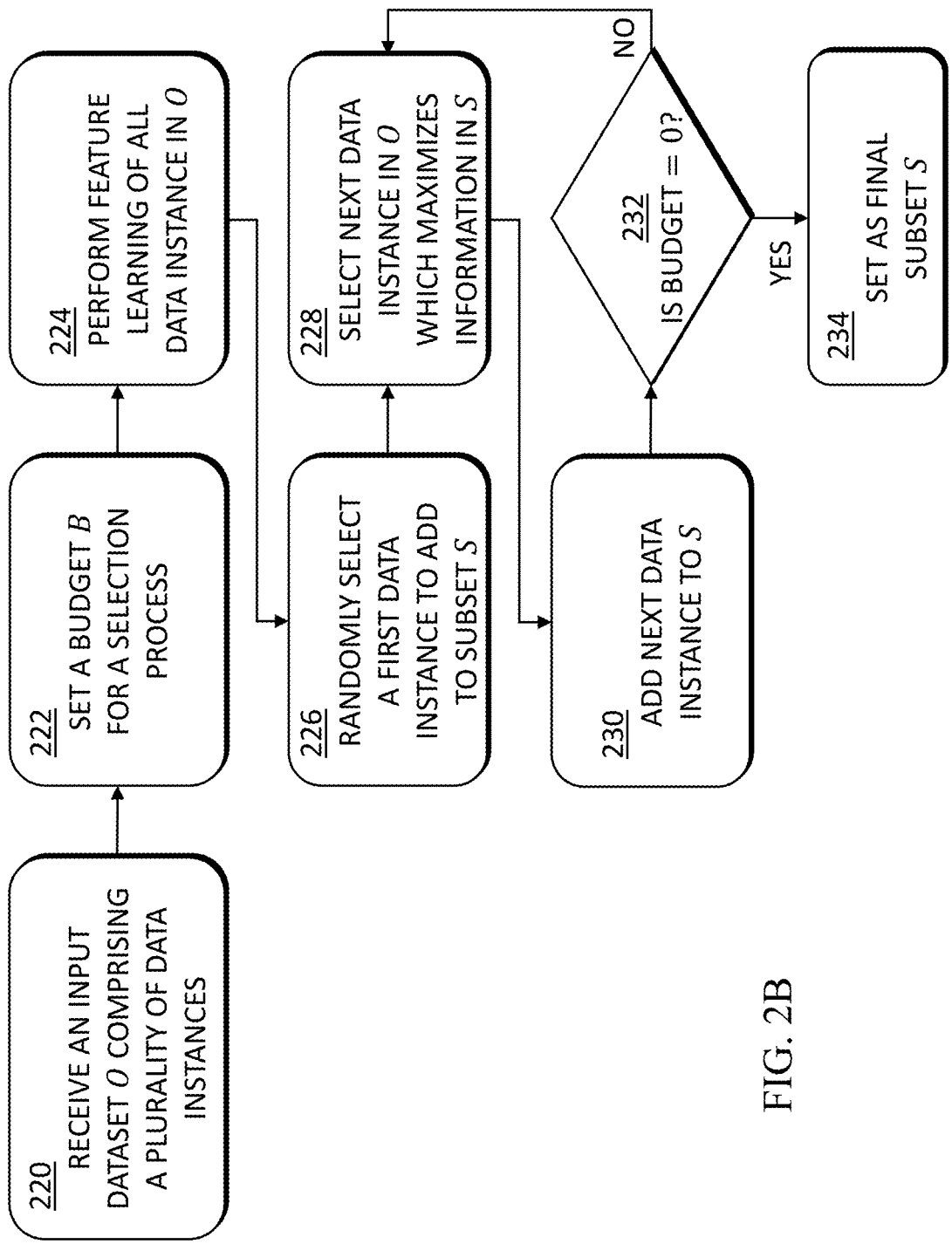

FIG. 2B is a flowchart detailing the functional steps in another exemplary process for automated selecting of an optimal representative subset of data instances or samples from a provided dataset, in accordance with some embodiments of the present invention.

In some embodiments, in step 220, an input dataset O comprising a plurality of data samples or instances may be received.

In some embodiments, O denotes an original population, and S denotes a sample set defined as a subset of O, which is collected via a specified process in order to obtain instances that can represent original population O. In some embodiments, a representative subset S is a special subset of original dataset O, which satisfies at least three main characteristics:

S is smaller in size compared to O;
S captures the most information from O compared to any other subset of the same size; and
S has none or a very low redundancy among the data instances included therein.

In some embodiments, in step 222, a budget B may be set to define boundaries of a selection process for an optimal representative subset S of data instances from dataset O. For example, the budget B may be set as a maximum number of data samples in subset S, which may determine a number of instance requiring annotation (E.G., manual annotation) in connection with a machine learning model training process. In another example, a budget B may be set as a maximum allowable computational time, which may determine a computational time required for a training process for a machine learning model using subset S as a training dataset.

In some embodiments, in step 224, the instructions of feature extraction module 112 may cause it to perform feature extraction or representation-learning with respect to each data instance in set O, to obtain a feature vector representation of each data instance in O. A feature learning or representation learning step may take place with respect to each data instance in set O. In some embodiments, a representation feature vector may be calculated and/or extracted and/or learned with respect to each data instance in O. In some embodiments, this step is employed to automatically discover a data representation of each data instance that is computationally convenient for processing. In some embodiments, feature learning techniques may include any suitable feature extraction and/or dimensionality reduction method. In some embodiments, suitable feature learning methods may be selected based, e.g., on the type of data instance in set O (e.g., images, textual data, voice data, etc.). In some embodiments, such methods include, but are not limited to, supervised or unsupervised dictionary learning, autoencoding, k-means clustering, principal component analysis, independent component analysis, linear embedding, neural network model features, frequency space mapping, image histogram, and/or SIFT features.

In some embodiments, in step 226, and as can be seen in FIG. 3A, the instructions of training set construction module 114 may cause it to select a first data instance $D_i$, e.g., at random, from O, and move it to S, to initialize the selection process of subset S.

In some embodiments, in steps 228-232, the instructions of training set construction module 114 may cause it to perform an iterative process for selecting an optimal representative subset S of data instances from the received dataset. FIGS. 3A-3E schematically illustrate a process implemented in steps 228-232.

Then, in step 228, and as can be seen in FIG. 3B, a next data instance $D_{i+1}$ may be selected from O for moving to subset S, wherein $D_{i+1}$ is selected to maximize an information quantity in S, as follows:

$$O{:}k{=}\max(\text{information}(s))$$

Accordingly, a selection process of $D_{i+1}$ may be based, at least in part, on calculating an information quantity in each data instance remaining in O, to select an instance $D_{i+1}$ which, if moved to S, maximizes an information addition to S. In some embodiments, information maximization may be based on any suitable information quantification methodology which compares the feature vectors associated with next data instance $D_{i+1}$ with the feature vectors of each of the data instances already in S. In some embodiments, such methodology may be based on, e.g., feature Euclidean distance calculation, an information entropy calculation between $D_{i+1}$ and S, a feature probability distribution, and/or any other methodology.

Accordingly, in step 230, if it is determined that next data instance $D_{i+1}$ represents a maximal information addition from O to S, the next data instance is added to S and removed from O. Steps 228-232 are then repeated for selecting next data instances $D_{i+2}, D_{i+3} \ldots D_{i+n}$, as can be seen in FIGS. 3C-3E. Thus, for example, in FIG. 3A, data instance $D_i$ is randomly selected for adding to S. In FIG. 3B, next data instance $D_{i+1}$, representing the greatest information quantity over $D_i$ among all remaining data instance in O, is selected for adding to S. Then, in FIG. 3C, next data instance $D_{i+2}$, representing the greatest information quantity over $D_i$ and $D_{i+1}$ among all remaining data instance in O, is selected for adding to S. Similarly, in FIG. 3D, next data instance $D_{i+3}$, representing the greatest information quantity over $D_i$, $D_{i+1}$, and $D_{i+2}$ among all remaining data instance in O, is selected for adding to S. And so on, until $D_{i+n}$ is added to S.

In each iteration, in step 232, if it is determined that the budget B has not been depleted, steps 228-232 is repeated for selecting a next data instances $D_{i+2}, D_{i+3} \ldots D_{i+n}$, as can be seen in FIGS. 3C-3E. If in step 232, it is determined that the budget B has been depleted, the iterative process stops.

Finally, in step 234, all data instances which were added to S in steps 228-232 are set as final subset S. In this embodiment, the resulting subset S may not be fully representative of original set O, because the budget B may have been set at a too low value to allow for an optimal representative selection process. Alternatively, subset S may include redundancies in the case that the budget B has been set at a too high level.

In some embodiments, a follow up step may calculate an information score associated with subset S which estimates a coverage parameter of subset S with respect to original set O.

Figure 2C:
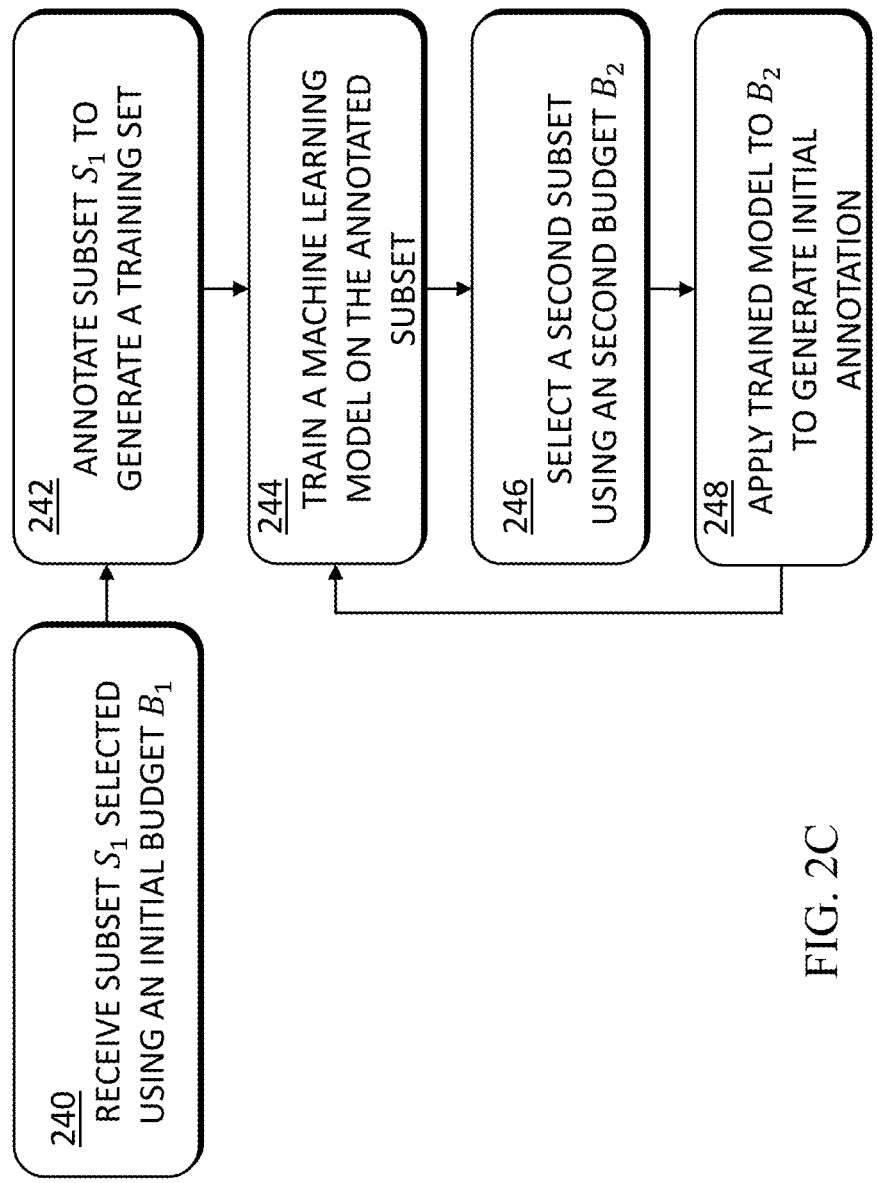

FIG. 2C is a flowchart detailing the functional steps in another exemplary process for automated selecting of an optimal representative subset of data instances or samples from a provided dataset, in accordance with some embodiments of the present invention.

In some embodiments, in step 240, an initial representative subset $S_1$ of full dataset O may be selected using a process similar to that described with respect to FIG. 2B, using, e.g., a relatively small budget (which may be reflected in terms of a maximum number of data instances in the subset and/or in terms of computational time using a GPU). This step may provide an initial informative subset of $S_1$ that is at least partially, but not necessarily fully, representative of full dataset O.

In some embodiments, in step 242, the initial subset $S_1$ may be annotated, e.g., by specialist annotators. In some embodiments, annotation or labeling is part of a process used to train a machine learning model to learn the certain patterns in data, to then recognize this pattern in future test samples to predict these results. For example, in the case of data instances that are mages, training data annotations can consist of, e.g.:

2-D bounding boxes or regions enclosing individual objects in images;
3-D (e.g., cuboids) bounding regions in images;
Polygons;
Point and landmarks;
Lines and splines;
Semantic segmentation (e.g., pixel-level annotation);
Text annotation; and/or
video object tracking.

In some embodiments, in step 244, a machine learning model may be trained on the annotated subset $S_1$. In some embodiments, the trained machine learning model may be trained to classify and/or predict a category and/or class associated with a data instance. Various types of machine learning models may be configured to handle different types of input and produce respective types of output; all such types are intended to be covered by present embodiments. In some embodiments, successfully applied in the context of any machine learning-based classification and/or prediction task which involves probabilistic classification, such as document classification, sentiment analysis, pixel classification, object segmentation, and the like.

In some embodiments, in step 246, a second informative subset $S_2$ may be selected from original dataset O. In some embodiments, subset $S_2$ may be selected based on a limited budget (which may be reflected in terms of data instances in the subset and/or in terms of computational time GPU). This step may provide a follow-up informative subset of $S_2$ that is at least partially representative of full dataset O.

In some embodiments, in step 248, the machine learning model trained in step 244 may be applied to subset $S_2$, to generate a prediction with respect to the data instances in $S_2$. For example, the trained machine learning model may be an image classification model configured to predict what an image represents. In other examples, the model may be an object detection model configured to detect instances of semantic objects of a certain class (such as humans, buildings, or cars) in an image. In other examples, additional and/or other computer vision tasks may be employed, e.g., object recognition, identification, pose estimation, optical character recognition, facial recognition, and the like.

In some embodiments, the output of the classification and/or prediction process may be used to label and/or annotate subset $S_2$, to generate a subset $S_2$ which comprises data instance with associated labels and/or annotations. In some embodiments, the output of the trained machine learning model may be used to automatically annotate the data instances in subset $S_2$.

In some embodiments, the automatically annotated subset $S_2$ may then be provided as an at least partially and/or roughly annotated dataset, for further annotation by specialists. Because subset $S_2$ has been at least partially annotated, then work of the specialist annotators may only consist of editing and/or correcting. Thus, the present disclosure may provide for improving the speed and accuracy of manually annotating data instances, which may lead to a reduction in costs and annotation errors, and hence to better training results.

The present invention may be a computer system, a computer-implemented method, and/or a computer program product. The computer program product may include a computer readable storage medium (or media) having computer readable program instructions thereon for causing a hardware processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A system comprising:
   at least one hardware processor; and
   a non-transitory computer-readable storage medium having stored thereon program instructions, the program instructions executable by the at least one hardware processor to:
   receive, as input, a dataset comprising a plurality of data instances,
   extract a feature vector representation of each of said data instances in said dataset,
   choose, from said dataset, a first data instance for adding to a subset of said dataset, wherein said first data instance is removed from said dataset,
   perform an iterative process comprising:
   (i) identifying one of said data instances in said dataset which represents a maximal information addition to said subset, based, at least in part, on measuring an information difference parameter between said feature vector representation of said identified data instance and said feature vector representations of all of said data instances in said subset, and
   (ii) adding said identified data instance to said subset and removing said identified data instance from said dataset,
   until said information difference parameter is lower than a predetermined threshold, and
   construct a training set comprising said data instances in said subset, each annotated with a class label selected from a set of class labels, wherein said training set is configured for training a machine learning model to predict a class label associated with each of said data instances in said dataset.

2. The system of claim 1, wherein said program instructions are further executable to receive a budgetary constraint, wherein said budgetary constraint causes said iterative process to stop before said information difference parameter is lower than said predetermined threshold.

3. The system of claim 2, wherein said budgetary constraint is expressed as at least one of: a maximal number of data instances in said subset, and a maximal computational time limit applicable to the performance of said repeating.

4. The system of claim 1, wherein said program instructions are further executable to:
   (i) train a machine learning model on said training set; and
   (ii) apply said trained machine learning model to said dataset, to predict as class label associated with each of said data instances in said dataset.

5. The system of claim 1, wherein said feature vector representation is obtained using at least one of: supervised or unsupervised dictionary learning, autoencoding, k-means clustering, principal component analysis, independent component analysis, linear embedding, neural network model features, frequency space mapping, image histogram, and scale-invariant feature transform (SIFT) feature detection algorithm.

6. The system of claim 1, wherein said measuring of said information difference is based, at least in part, on one of: a Euclidean distance calculation, an information entropy calculation, and a feature probability distribution calculation.

7. A computer-implemented method comprising:
   receiving, as input, a dataset comprising a plurality of data instances;
   extracting a feature vector representation of each of said data instances in said dataset;
   choosing, from said dataset, a first data instance for adding to a subset of said dataset, wherein said first data instance is removed from said dataset;
   performing an iterative process comprising:
   (i) identifying one of said data instances in said dataset which represents a maximal information addition to said subset, based, at least in part, on measuring an information difference parameter between said feature vector representation of said identified data instance and said feature vector representations of all of said data instances in said subset, and
   (ii) adding said identified data instance to said subset and removing said identified data instance from said dataset,
   until said information difference parameter is lower than a predetermined threshold; and
   constructing a training set comprising said data instances in said subset, each annotated with a class label selected from a set of class labels, wherein said training set is configured for training a machine learning model to predict a class label associated with each of said data instances in said dataset.

8. The computer-implemented method of claim 7, further comprising receiving a budgetary constraint, wherein said budgetary constraint causes said iterative process to stop before said information difference parameter is lower than said predetermined threshold.

9. The computer-implemented method of claim 8, wherein said budgetary constraint is expressed as at least one of: a maximal number of data instances in said subset, and a maximal computational time limit applicable to the performance of said repeating.

10. The computer-implemented method of claim 7, further comprising:
(i) training a machine learning model on said training set; and
(ii) applying said trained machine learning model to said dataset, to predict as class label associated with each of said data instances in said dataset.

11. The computer-implemented method of claim 7, wherein said feature vector representation is obtained using at least one of: supervised or unsupervised dictionary learning, autoencoding, k-means clustering, principal component analysis, independent component analysis, linear embedding, neural network model features, frequency space mapping, image histogram, and scale-invariant feature transform (SIFT) feature detection algorithm.

12. The computer-implemented method of claim 7, wherein said measuring of said information difference is based, at least in part, on one of: a Euclidean distance calculation, an information entropy calculation, and a feature probability distribution calculation.

13. A computer program product comprising a non-transitory computer-readable storage medium having program instructions embodied therewith, the program instructions executable by at least one hardware processor to:
receive, as input, a dataset comprising a plurality of data instances;
extract a feature vector representation of each of said data instances in said dataset;
choose, from said dataset, a first data instance for adding to a subset of said dataset, wherein said first data instance is removed from said dataset;
perform an iterative process comprising:
(i) identifying one of said data instances in said dataset which represents a maximal information addition to said subset, based, at least in part, on measuring an information difference parameter between said feature vector representation of said identified data instance and said feature vector representations of all of said data instances in said subset, and
(ii) adding said identified data instance to said subset and removing said identified data instance from said dataset,
until said information difference parameter is lower than a predetermined threshold; and
construct a training set comprising said data instances in said subset, each annotated with a class label selected from a set of class labels, wherein said training set is configured for training a machine learning model to predict a class label associated with each of said data instances in said dataset.

14. The computer program product of claim 13, wherein said program instructions are further executable to receive a budgetary constraint, wherein said budgetary constraint causes said iterative process to stop before said information difference parameter is lower than said predetermined threshold.

15. The computer program product of claim 14, wherein said budgetary constraint is expressed as at least one of: a maximal number of data instances in said subset, and a maximal computational time limit applicable to the performance of said repeating.

16. The computer program product of claim 13, wherein said program instructions are further executable to:
(i) train a machine learning model on said training set; and
(ii) apply said trained machine learning model to said dataset, to predict as class label associated with each of said data instances in said dataset.

17. The computer program product of claim 13, wherein said feature vector representation is obtained using at least one of: supervised or unsupervised dictionary learning, autoencoding, k-means clustering, principal component analysis, independent component analysis, linear embedding, neural network model features, frequency space mapping, image histogram, and scale-invariant feature transform (SIFT) feature detection algorithm.

18. The computer program product of claim 13, wherein said measuring of said information difference is based, at least in part, on one of: a Euclidean distance calculation, an information entropy calculation, and a feature probability distribution calculation.

* * * * *